Dec. 20, 1932.  G. H. E. DE RAM  1,891,706

LEAKLESS JOINT FOR ROTATING SHAFTS

Filed Aug. 8, 1930

G. H. E. de Ram
INVENTOR

By: Marks & Clerk
ATTYS.

Patented Dec. 20, 1932

1,891,706

UNITED STATES PATENT OFFICE

GEORGES HENRI ERNEST DE RAM, OF BOULOGNE SUR SEINE, FRANCE

LEAKLESS JOINT FOR ROTATING SHAFTS

Application filed August 8, 1930, Serial No. 473,989, and in France September 3, 1929.

The present invention relates to a leakless joint for rotating shafts, and it is applicable to all apparatus used with liquids or gaseous fluids in which leakless conditions are to be assured around a rotating or oscillating part. The said joint may be employed to advantage in all cases in which a stuffing box is commonly used.

The invention consists in principle in interposing between the rotating shaft and a stationary casing an elastic disk which bears on the one hand upon the casing and on the other hand upon a flange of said shaft, by means of packing members which are subjected to an adjustable pressure.

The following description with reference to the accompanying drawing relates to two embodiments of the invention.

Figure 1:
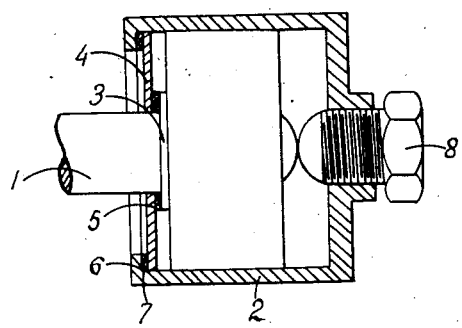
Fig. 1 is an axial section of an apparatus in conformity to the invention, comprising a single elastic disk.

Referring to Fig. 1, the end of the shaft 1 is contained in a casing 2, and near this end is a flange 3 upon which an elastic disk 4 is caused to bear, through the medium of a packing ring 5 of suitable material. Said elastic disk also bears upon a flange 6 of casing 2, by means of a packing ring 7 of adequate material. The pressure required to apply the disk 4 upon the packing rings 5 and 7 is obtained by turning a stop screw 8 by which said casing is axially displaced with reference to the shaft. Said elastic disk may consist of sheet steel or of any other suitable material, and it can be applied directly upon the shaft or the casing without the use of packing.

Figure 2:
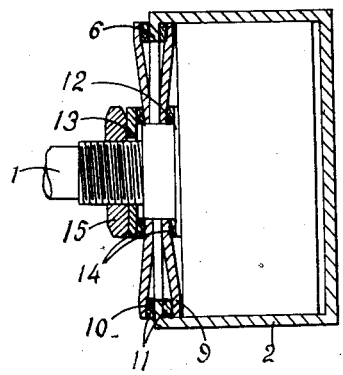
Fig. 2 is a like section of an apparatus according to the invention comprising two elastic disks.

In the construction shown in Fig. 2, the device comprises two elastic disks 9 and 10 which are applied on the one hand against the flange 6 of the casing 2 which is held between the two disks by means of packing rings 11, and on the other hand between the washers 12—13 situated on the respective sides of the two rings, and between said disks and washers are suitable packing members 14. The required pressure is obtained by the use of a nut 15 mounted against the washer 13 and screwed upon a threaded part of the shaft 1. The arrangement shown in Fig. 2 provides for the balancing of the axial thrust without requiring the stop screw 8.

The disk in Fig. 1 is shown as perfectly flat. To obtain such a disk during the operation of the joint, the device comprises in the first place a stamped disk of concave form which is then flattened by the pressure exercised on the end of the shaft by the screw 8. If the said disk is flat in the first place, it will have in the working position an appearance resembling the one which is shown in Fig. 2 for the disk 9.

Obviously, the two forms of construction hereinabove described and represented in the accompanying drawing are not of a limitative nature, and may be suitably modified without departing from the spirit of the invention. In particular, it should be remarked that in these two constructions, the elastic disks are free, but they may evidently be attached, either upon their outer periphery or at the shaft, or they may even form part of the shaft or of the casing.

I claim:

1. A joint for the purpose specified comprising a casing having a closed end and provided at the other end with an annular flange defining an opening, a shaft extending through the opening, a flexible disk under elastic tension on the shaft, packing members interposed, respectively, between the flexible disk and the casing and the shaft, the pressure imparted to the packing members being due to the direct application of the disk under tension on the packing members, and means carried by the casing engaged with the shaft for moving the casing axially with respect thereto to cause binding engagement of the disk with the flange and shaft.

2. A joint as claimed in claim 1, in which the flexible disk under tension is fixed to the shaft, the packing members being interposed only between the disk and the casing.

3. A joint as claimed in claim 1, in which the flexible disk under tension is fixed to the casing, the packing members being interposed only between the disk and the shaft.

4. A joint for the purpose specified comprising a casing having upon one end an annular flange defining an opening, a set screw carried by the other end of the casing, a shaft extending into the opening, a flexible disk under elastic tension mounted on the shaft, packing members interposed between the disk and flange and shaft and disk, the pressure of said packing members being only due to the mere direct application of the disk under tension on the packing members, said screw being engaged with the shaft and operable to move the casing axially with respect thereto, as and for the purpose set forth.

5. A joint for the purpose specified comprising a casing having a closed end and provided at the other end with an annular flange defining an opening, a shaft extending through the opening, two flexible disks under elastic tension on the shaft on opposite sides of the flange, washers on the shaft on both sides of the disks, packing members interposed between the disks and flange and washers and disks, and means for adjusting one of the washers with respect to the other.

In testimony whereof he has signed this specification.

GEORGES HENRI ERNEST DE RAM.